United States Patent [19]

Westall

[11] Patent Number: 5,073,618

[45] Date of Patent: Dec. 17, 1991

[54] PROCESS FOR THE PRODUCTION OF ORGANOSILICON COMPOUNDS

[75] Inventor: Stephen Westall, Barry, Wales

[73] Assignee: Dow Corning Limited, Barry, Wales

[21] Appl. No.: 473,075

[22] Filed: Jan. 31, 1990

[30] Foreign Application Priority Data

Feb. 9, 1989 [GB] United Kingdom ............... 8902936

[51] Int. Cl.$^5$ ............................................. C08G 77/06
[52] U.S. Cl. ....................................... 528/13; 528/23; 528/32; 528/43; 556/462
[58] Field of Search ................ 528/13, 23, 32, 43; 556/462

[56] References Cited

U.S. PATENT DOCUMENTS 3,094,497  6/1963  Hyde ................................. 260/18
3,160,601  12/1964  Hyde ................................ 260/46.5
4,701,490  10/1987  Burkhardt et al. ................ 528/23
4,745,144  5/1988  Itoh et al. ......................... 528/23

Primary Examiner—Melvyn I. Marquis
Attorney, Agent, or Firm—Sharon K. Severance

[57] ABSTRACT

Process for the production of organosilicon condensation products which comprises contacting (A) at least one organosilicon compound having in the molecule at least one silanol group, the organic substituents being selected from monovalent hydrocarbon groups having from 1 to 14 carbon atoms and monovalent substituted hydrocarbon groups having from 1 to 10 carbon atoms, and (B) a borate or phosphate of sodium or potassium.

The condensation products find application in, for example textile treatments and paper coating.

8 Claims, No Drawings

PROCESS FOR THE PRODUCTION OF ORGANOSILICON COMPOUNDS

This invention relates to the production of organosiloxanes and relates in particular to a process for the condensation of organosiloxanes having silicon-bonded hydroxyl groups.

The production of organosiloxane polymers by the polymerisation or copolymerisation of relatively low molecular weight organosiloxanes is a well known step in the manufacture of commercial silicones. Generally the polymerisation or copolymerisation is carried out by contacting cyclic organosiloxanes or low molecular weight siloxanols, or mixtures thereof, with an acidic or a basic catalyst. Many substances which may be employed as catalysts have been described in the literature and include sulphuric acid, hydrochloric acid, Lewis acids, sodium hydroxide, potassium hydroxide, tetramethylammonium hydroxide, tetrabutylphosphonium silanolate, amines and others. However, although such catalysts are effective in producing the desired increase in molecular weight of the starting materials, they have the disadvantage of causing scission and rearrangement of the siloxane bonds. As a result of such rearrangement the product often contains a significant proportion of low molecular weight siloxanes. For many applications, for example in the fabrication of silicone elastomers, it is necessary to remove such low molecular weight materials by devolatilisation in order to obtain a satisfactory product. Rearrangement of the siloxane bonds is also undesirable when the polymer is to contain a planned distribution of two or more types of organic substituents, for example in the production of a polydimethylsiloxane containing a proportion of organofunctional, e.g. aminoalkyl, substituents.

Catalysts for promoting ≡SiOH + ≡SiOH and ≡SiOH + SiOR, R = organic, without siloxane bond cleavage have been disclosed in G.B. 895 091 and 918 823 and include for example tetramethylguanidine 2-ethylcaproate and n-hexylamine 2-ethylcaproate. However, many of such catalysts are liquids, or are not suitable for use at high temperatures, or are not readily removable from the product. There has, therefore, been a continuing search for substances which would be effective as catalysts for the production of condensation products of organosiloxanols but which would not cause molecular rearrangement and the consequent presence of significant amounts of low molecular weight species in the product. In particular the desired catalysts should preferably be suitable for use in heterogeneous systems and remain active during use, thereby enabling their recovery and re-use in batch processes or their application in a continuous process.

We have now found that certain compounds of sodium and potassium have the ability to catalyse the condensation of organosilicon compounds. We have further found that said sodium and potassium compounds can advantageously be employed in the production of organosilicon polymers having a relatively low content of low molecular weight species.

Accordingly, the present invention provides a process for the production of an organosilicon condensation product which comprises contacting (A) at least one organosilicon compound having in the molecule at least one silanol group and wherein the silicon-bonded organic substituents are selected from monovalent hydrocabon groups having from 1 to 14 carbon atoms and monovalent substituted hydrocarbon groups having from 1 to 10 carbon atoms, the said substituted hydrocarbon groups being non-acidic in character, and (B) a borate or phosphate of sodium or potassium.

The process of this invention may be applied in the production of condensation products of any type of organosilicon compound having at least one silanol, that is ≡SiOH, group in the molecule. Thus, the organosilicon compound may be an organosilane, organosiloxane or a silcarbane or mixtures of the same type or of different types of such organosilicon compounds. The silicon-bonded organic substituents in the organosilicon compound may be monovalent hydrocarbon groups having from 1 to 14 inclusive carbon atoms, for example alkyl, aryl, aralkyl, alkaryl or alkenyl groups, or they may be monovalent substituted hydrocarbon groups having up to 10 carbon atoms and which are non-acidic in character, that is groups not containing acidic substituents such as carboxyl, sulphate and sulphonic. Examples of operative non-acidic groups are amino-substituted alkyl and aryl groups, mercaptoalkyl groups, haloalkyl groups, cyanoalkyl groups and hydroxyalkyl groups. Specific examples of the organic substituents which may be present in the organosilicon compounds employed in the process of this invention are methyl, ethyl, propyl, hexyl, dodecyl, tetradecyl, phenyl, xylyl, tolyl, phenylethyl, vinyl, allyl, hexenyl, —RNH$_2$, —RNHCH$_2$CH$_2$NH$_2$, —RSH, —RBr, —RCl and —ROH wherein R represents a divalent organic group, preferably having less than 8 carbon atoms for example alkylene e.g. —(CH$_2$)$_3$— and —CH$_2$CHCH$_3$CH$_2$—, arylene e.g. —C$_6$H$_4$— or aralkylene e.g. —(C$_6$H$_4$.CH$_3$)—. For the majority of commercial applications at least 50% of the total organic substituents in (A) will be methyl groups any remaining substituents being selected from phenyl and vinyl groups.

Although applicable to any type of organosilicon compound having at least one silanol group the process of this invention is particularly useful for the production of higher molecular weight organosiloxane polymers from lower molecular weight hydroxylated species. For example, during the production of organosiloxanes by the hydrolysis of the corresponding organochlorosilanes there is obtained a mixture of low molecular weight organosiloxanes having two or more silanol groups per molecule. The process of this invention may be employed to increase the molecular weight of such organosiloxanes while avoiding the production of undue amounts of volatile siloxanes. According to a preferred embodiment of this invention the organosilicon compounds (A) are silanol-terminated polydiorganosiloxanes, that is substantially linear organosiloxane polymers or oligomers having a hydroxyl group attached to each terminal silicon atom. Such polydiorganosiloxanes include those which can be represented by the average general formula

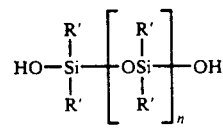

wherein each R' represents the hereinabove defined organic substituents and n is an integer, preferably from 1 to about 100. As hereinbefore stated commercially the R' substituents are normally predominantly methyl with any remaining R' substituents being selected from vinyl and phenyl.

If desired the condensation products may be end-stopped with triorganosiloxy units. One method of effecting such end-stopping comprises incorporating in the reaction mixture a trioganosilane, for example a triorganoalkoxysilane, which is reactive with the condensation product. Such a reaction may be effected in the presence of a suitable catalyst, for example barium or strontium hydroxide as described in our copending application Ser. No. 07/473,080, filed on Jan. 31, 1990. However, a more preferred method of producing end-stopped polydiorganosiloxanes employing the process of this invention comprises employing as organosilicon compound (A) both (i) at least one polydiorganosiloxane having a hydroxyl group attached to each terminal silicon atom, and (ii) a polydiorganosiloxane terminated with a hydroxyl group at one end and a trioganosiloxy group at the other.

The catalyst substance (B) is a borate or phosphate of sodium or potassium. Specific examples of such catalysts are $K_2B_4O_7.4H_2O$, $K_2BO_2.xH_2O$, $K_2B_{10}O_{16}.8H_2O$, $K_3PO_4.xH_2O$, $Na_2B_4O_7.4H_2O$, $NaBO_3.4H_2O$, $NaBO_2.xH_2O$ and $Na_3PO_4.12H_2O$. The sodium and potassium compounds may be employed in their anhydrous or hydrated forms. In the case of the phosphate compounds the phosphate anion should not contain hydrogen. Thus, the phosphates of sodium and potassium employed according to this invention do not include the hydrogen phosphates. The particle size of the catalyst substance is not critical. Generally, the smaller the particles the greater is the catalytic surface available. However, very fine particle size powders may be more difficult to remove from the condensation product.

The process of this invention involves contacting the organosilicon compound (A) with the catalyst (B) at a temperature at which the desired rate of molecular weight increase occurs. The temperatures employed may vary within wide limits for example from about 30° C. to about 200° C. Reaction at the lower temperatures is, however, normally too slow for commercial purposes and the process is preferably carried out at temperatures within the range from about 70° C. to 150° C. It is also preferred to accelerate the removal of water formed during the condensation reaction by carrying out the process under reduced pressure, that is, at a pressure less than normal atmospheric and most preferably less than about 0.5 bar. One method of carrying out the process is by means of a batch procedure. For example, the catalyst may be dispersed in the organosilicon compound and the mixture raised to the required temperature. Alternatively, the organosilicon compound may be preheated prior to the addition of the catalyst. Advantageously the mixture is agitated during the reaction period to maintain the catalyst in suspension. Sufficient catalyst is employed to achieve the desired rate of condensation having regard to the nature and geometry of the processing equipment, temperature and other factors. From considerations of speed of reaction and economy of operation we prefer to employ from about 0.001 to about 5% by weight of the catalyst based on the weight of the organosilicon compound. Termination of the condensation reaction, if desired, may be achieved for example by lowering the temperature of the mixture, and/or raising the reaction pressure to atmospheric and/or by separation or neutralisation of the catalyst.

Because of their heterogeneous nature the catalysts (B) are particularly adapted for use in processes involving manufacture on a continuous, rather than a batch, basis. Properly employed such so-called 'continuous processes' avoid the delays and costs common to batch processing, for example those involved in the charging and discharging of the reaction vessel and separation of the catalyst material from the product. Thus, for example, the process of this invention may be advantageously employed for the continuous production of higher molecular weight siloxane polymers from lower molecular weight hydroxyl-containing species. When carrying out the process of this invention in a continuous mode contact between the catalyst material and the organosilicon compound may be achieved by passing the organosilicon compound over or through a bed containing the catalyst material. When employing viscous reactants or products it may be necessary to adjust the porosity of the bed by granulation of the catalyst or other means. We have found that a particularly suitable form of bed for continuous operation can be obtained by depositing the catalyst substance in or on a particulate solid material, for example silica, which is substantially inert under the process conditions and which has a particle size appropriate to the desired porosity of the bed.

The condensation products produced by the process of this invention may be employed in any of the variety of applications known for the corresponding products made by prior art procedures. For example they may be used for treating textiles to render them water repellent and impart softness, as components of paper coating compositions, as heat transfer liquids and in the production of adhesives and sealing materials.

The following Examples in which Me represents methyl and Ph represents phenyl illustrate the invention.

EXAMPLE 1

To 1000 g of silanol-terminated linear polydimethylsiloxane (number average molecular weight Mn by g.p.c=3000) was added 20 g of $Na_2B_4O_7.10H_2O$ as catalyst. The mixture was stirred vigorously, heated to 100° C. under 10 mm.Hg pressure and maintained at that temperature and pressure with stirring for two hours. The reaction mixture was then filtered to remove the catalyst, allowed to cool and then analysed for % non-volatile content (1 g sample heated at 760 mm.Hg for 3 hours at 150° C.), Mn and polydispersity.

The procedure was repeated employing two further catalysts, namely $NaBO_2.xH_2O$ and $K_2B_4O_7.4H_2O$. The analytical results with respect to each catalyst were as follows:

| | Weight % Non-Volatile | Mn | Polydispersity |
|---|---|---|---|
| $Na_2B_4O_7.10H_2O$ | 98.9 | 15315 | 2.22 |
| $NaBO_2.xH_2O$ | 99.6 | 134000 | 2.02 |
| $K_2B_4O_7.4H_2O$ | 98.4 | 38300 | 2.28 |

The non-volatile content of the polydimethylsiloxane starting material was typically 97.5 weight percent. When the procedure was carried out employing KOH as catalyst the non-volatile content of the product was only 86.5 weight percent.

EXAMPLE 2

The procedure of Example 1 was repeated employing other borates and phosphates of sodium and potassium as catalysts and the following results obtained:

|  | Weight % Non-Volatile | Mn |
| --- | --- | --- |
| $Na_3PO_4.12H_2O$ | 97.9 | 94500 |
| $K_3PO_4$ | 93.6 | >200000 |
| $K_2B_{10}O_{16}$ | 98.5 | 14787 |
| $KBO_2.xH_2O$ | 96.2 | >200000 |

EXAMPLE 3

$K_2B_4O_7.4H_2O$ was dissolved in water and sufficient of an amorphous aluminosilicate was then added to the solution to form a slurry. The slurry was decanted and dried to leave a supported catalyst material containing approximately 2% by weight of $K_2B_4O_7.4H_2O$. The solid was charged to a heated vertical glass reaction column of internal diameter 32 mm to form a fixed bed 65 cm deep.

Preheated silanol-terminated polydimethylsiloxane (viscosity $8 \times 10^{-5}$ m²/s at 25° C., silanol content 18000 ppm) was fed to the top of the packed column at a temperature of 145° C., the pressure in the column being maintained at about 50 mbar. Residence time in the column was 10 minutes and the column outlet temperature about 80° C. Analysis of the condensation product showed a viscosity of $3.087 \times 10^{-3}$ m²/s at 25° C., a silanol content of 1410 ppm and a $K^+$ content of 9 ppm.

EXAMPLE 4

An α,ω silanol-terminated phenylmethylsiloxane of average structure

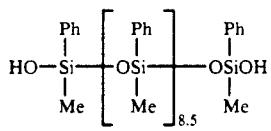

was heated to 70° C. in the presence of 0.05% w/w tripotassium orthophosphate at a pressure of 105 mbar. After one hour the siloxane had changed from a mobile liquid to a viscous gum. Analysis of the gum by gel permeation chromatography showed it to contain 90.7% w/w

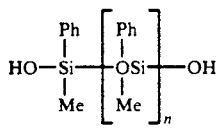

where n was approximately 455 and 9.3% w/w of cyclophenylmethylsiloxanes. This compares with an equilibrium concentration of cyclophenylmethylsiloxanes of about 30% w/w when polymerisation is carried out via siloxane ring-chain equilibration.

EXAMPLE 5

An α,ω 1,1,1 trifluoropropylmethylsiloxane oligomer of average structure

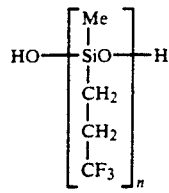

where n=5 was heated to 100° C. in the presence of 0.05% w/w trisodium orthophosphate at a pressure of 105 mbar. After one hour the siloxane had become viscous and the silanol content had dropped from an initial value of 4.4% w/w to 2200 ppm. This corresponds to a product polymer of average structure

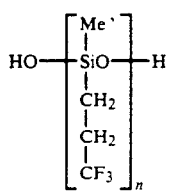

where n has a value of approximately 99.

EXAMPLE 6

A mixture of siloxane oligomers comprising $Me_3Si(OSiMe_2)_nOH$ and $HO(SiMe_2O)_nH$ of viscosity 72 cS at 25° C. and containing 12,520 ppm silanol and 1% w/w of $Me_3Si-$ was heated to 105° C. at 105 mbar pressure in the presence of 0.05% w/w tripotassium orthophosphate. Over a period of 5.5 hours the silanol content of the mixture decreased to 194 ppm and the viscosity increased to 680 cS at 25° C. The product was a siloxane polymer of average structure $Me_3Si(OSiMe_2)_nOSiMe_3$ where n had a value of about 182.

That which is claimed is:

1. A process for the production of an organosilicon condensation product which comprises contacting (A) at least one organosilicon compound having in the molecule at least one silanol group and wherein the organo substituents are selected from the group consisting of monovalent hydrocarbon groups having from 1 to 14 carbon atoms and monovalent substituted hydrocarbon groups having from 1 to 10 carbon atoms, said substituted hydrocarbon groups being non-acidic in character, and (B) a borate or phosphate of sodium or potassium.

2. A process as claimed in claim 1 wherein (A) and (B) are contacted at a temperature in the range from 70° C. to 150° C.

3. A process as claimed in claim 1 wherein (A) and (B) are contacted at a pressure which is less than atmospheric.

4. A process as claimed in claim 1 wherein the organosilicon compound (A) is passed over or through a bed containing (B).

5. A process as claimed in claim 1 wherein (B) is present dispersed in and/or on a particulate solid which is inert under the reaction conditions.

6. A process as claimed in claim 1 wherein organosilicon compound (A) is a substantially linear polydiorganosiloxane having a hydroxyl group attached to each terminal silicon atom.

7. A process as claimed in claim 6 wherein organosilicon compound (A) comprises both (i) a polydiorganosiloxane having a hydroxyl group attached to each terminal silicon atom and (ii) a polydiorganosiloxane terminated with a hydroxyl group at one end and a triorganosiloxy group at the other.

8. A process as claimed in claim 1 wherein the organic substituents present in (A) are predominantly methyl groups, any remaining substituents being selected from the group consisting of phenyl and vinyl groups.

* * * * *